Feb. 13, 1951  J. A. JENSEN  2,541,653
CLOSURE FOR PIPE ENDS AND THE LIKE
Filed Aug. 22, 1946
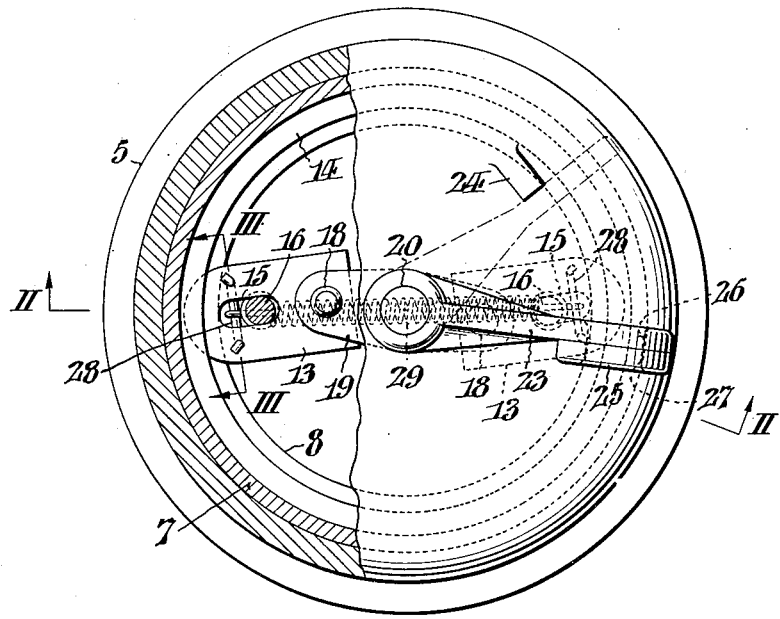
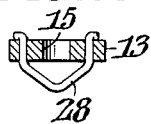
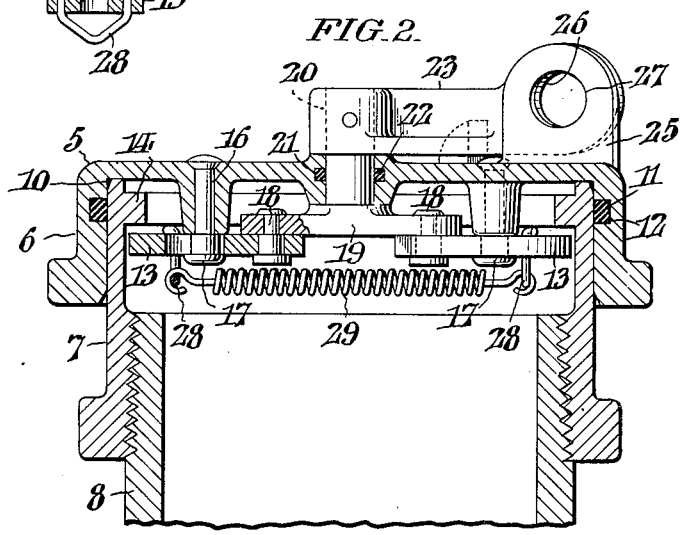
WITNESSES
INVENTOR:
James A. Jensen,
BY
ATTORNEYS.

Patented Feb. 13, 1951

2,541,653

UNITED STATES PATENT OFFICE 2,541,653
CLOSURE FOR PIPE ENDS AND THE LIKE

James A. Jensen, Haverford, Pa., assignor to Philadelphia Valve Company, Philadelphia, Pa., a copartnership Application August 22, 1946, Serial No. 692,191

1 Claim. (Cl. 220—55)

This invention relates to closures for open pipe ends and the like. More particularly, it has reference to closures of a quick release and removable type useful, for example, in connection with the ends of the fill pipes of tanks such as fuel oil storage tanks either located at remote points within buildings or buried outdoors, whereto access must be had from time to time for connection of the drain hoses of delivery trucks.

The chief aim of my invention is to provide an inexpensive closure of the kind referred to with simple and easily incorporated means which can be relied upon to hold the closure securely in place with assurance against the possibility of fluid leakage.

How the foregoing and other objects and advantages are attained in practise will appear from the following detailed description of the attached drawings, wherein Fig. 1 is a view partly in plan and partly in horizontal section showing the closure of my invention in an embodiment designed for use in connection with the fill pipe of a liquid storage tank.

Fig. 2 is an axial section of the organization taken as indicated by the angled arrows II—II in Fig. 1; and Fig. 3 is a detail section taken as indicated by the angled arrows III—III in Fig. 1.

As herein illustrated, my improved closure is in the form of a cover 5 with a pendent peripheral flange 6 adapted to fit down over an annular adapter 7 which is screwed onto the upper end of the fill pipe 8. The upper end of the adapter is beveled off or rounded as at 10 to facilitate application thereto of the cover 5 which has a ring gasket 11 of rubber or the like lodged in an internal circumferential groove 12 for sliding pressure contact with the outer surface of said adapter and for maintenance of a fluid tight seal. Disposed at diametrically opposite points within the hollow of the cover 5, is a pair of bolt-like keepers 13 with rounded outer ends which are adapted to underreach a circumferential flange 14 internally of the adapter 7 as shown in Fig. 1 and to thereby normally prevent upward displacement of the cap. The keepers 13 are centrally slotted longitudinally, as at 15, for engaging guide studs 16 which are permanently secured in the top of the cover 5 and provided with heads 17 for retainment of said keepers. At their inner ends, the keepers 13 are pivotally connected at 18 to the opposite ends of a double armed radius element 19 fixedly secured to, or integrally formed with, a short shaft 20 which extends up through a bearing boss 21 centrally of the cover 5, a gasket 22 surrounding said shaft within an internal circumferential groove of said boss to effect a fluid seal at that region. Pinned to the protruding upper end of the shaft 20 is an actuating lever 23 whose swing is limited by radially-arranged fixed stops 24 and 25 upstanding from the top of the cap 5. As shown, the lever 23 has an eye 26 at its outer end for registry with an eye 27 in the stop 25 to permit attachment of a pad lock (not shown) and thereby prevent unauthorized removal of the cover. Anchored in the keepers 13 adjacent their outer ends in the manner shown in Fig. 3, are staples 28 to which the opposite ends of a helical toggle spring 29 are hooked.

The cover 5 is released for removal from the fill pipe 8 by shifting the lever 23 counter clockwise in Fig. 2, from the full line position, to the dot and dash line position against the stop 24. As a consequence of the attendant angular movement imparted to the element 19, the keepers 13 are inwardly retracted concurrently and their rounded ends thereby withdrawn from beneath the internal flange 14 of the adapter 7, such withdrawal being permitted by the slots 15 which, in cooperation with the studs 16, constitute changing pivots for said keepers. By its toggle action, the tension spring 29 functions to yieldingly maintain the parts in either of the final positions to which they may be shifted by means of the lever 23, as will readily be understood from Fig. 2.

While I have herein shown and described my invention as a closure for a fill pipe, it is not to be construed as limited to such use, since, by suitable variations within the scope of the appended claim, it can be readily made to serve for the mouths of receptacles or containers of different sorts, automobile radiators, automobile gasoline tanks, etc., where a quick-removable sealing cover is desirable or essential.

Having thus described my invention, I claim:

A closure for the end of a pipe or the like comprising a hollow cap with a peripheral flange to fit down over the pipe end; a shaft extending axially through the cap and having an actuating member at its outer end; and locking mechanism wholly within the confines of the hollow of the cap including a pair of elongate radially arranged keeper elements with longitudinal slots engaged with diametrically disposed studs pendent from the inner side of the cap so as to be moveable endwise and swingable for retraction from a normal latching position beneath an internal circumferential shoulder flange at the end of the pipe, a member at the inner end of the shaft having oppositely-extending arms pivotally connected to the contiguous ends of the keeper elements, and a spring also within the confines of the hollow of the cap in tension between anchorages adjacent the outer ends of the keeper elements beyond the slots, said spring yieldingly maintaining said elements either in their latching or retracted positions.

JAMES A. JENSEN.

REFERENCES CITED

The following references are of record in the file of this patent:

UNITED STATES PATENTS

| Number | Name | Date |
| --- | --- | --- |
| 1,037,083 | Thurman | Aug. 27, 1912 |
| 1,300,633 | Miller | Apr. 15, 1919 |
| 1,555,759 | Rowe | Sept. 29, 1925 |
| 1,709,459 | Callahan | Apr. 16, 1929 |
| 1,774,091 | Glawe et al. | Aug. 26, 1930 |
| 1,991,113 | Nette | Feb. 12, 1935 |
| 2,106,837 | Trucks | Feb. 1, 1938 |
| 2,125,819 | Schneider | Aug. 2, 1938 |
| 2,377,725 | Smith | June 5, 1945 |